(12) United States Patent
Zhang et al.

(10) Patent No.: US 12,555,550 B2
(45) Date of Patent: Feb. 17, 2026

(54) LIQUID CRYSTAL DISPLAY PANEL AND DISPLAY TERMINAL

(71) Applicant: Shenzhen China Star Optoelectronics Semiconductor Display Technology Co., Ltd., Guangdong (CN)

(72) Inventors: Qi Zhang, Shenzhen (CN); Yoonsung Um, Shenzhen (CN); Bangyin Peng, Shenzhen (CN)

(73) Assignee: Purplevine IP, Beijing (CN)

( * ) Notice: Subject to any disclaimer, the term of this patent is extended or adjusted under 35 U.S.C. 154(b) by 0 days.

(21) Appl. No.: 17/621,917

(22) PCT Filed: Dec. 3, 2021

(86) PCT No.: PCT/CN2021/135245
§ 371 (c)(1),
(2) Date: Dec. 22, 2021

(87) PCT Pub. No.: WO2023/092631
PCT Pub. Date: Jun. 1, 2023

(65) Prior Publication Data
US 2024/0296810 A1  Sep. 5, 2024

(30) Foreign Application Priority Data

Nov. 23, 2021 (CN) .......................... 202111391449.1

(51) Int. Cl.
| | | |
|---|---|---|
| G09G 3/36 | (2006.01) | |
| G02F 1/1362 | (2006.01) | |
| G09G 3/20 | (2006.01) | |

(52) U.S. Cl.
CPC ..... *G09G 3/3688* (2013.01); *G02F 1/136222* (2021.01); *G02F 1/136286* (2013.01);
(Continued)

(58) Field of Classification Search
CPC .............. G09G 3/3688; G09G 3/3685; G09G 2310/08; G09G 320/0271; G09G 3/20;
(Continued)

(56) References Cited

U.S. PATENT DOCUMENTS

| | | | | |
|---|---|---|---|---|
| 5,777,700 A | * | 7/1998 | Kaneko | ............. G02F 1/133753 349/39 |
| 2005/0253797 A1 | * | 11/2005 | Kamada | ............ G02F 1/133753 345/89 |

(Continued)

FOREIGN PATENT DOCUMENTS

| | | |
|---|---|---|
| CN | 104503159 A | 4/2015 |
| CN | 104865734 A | 8/2015 |

(Continued)

*Primary Examiner* — William Boddie
*Assistant Examiner* — Saifeldin E Elnafia
(74) *Attorney, Agent, or Firm* — Nathan & Associates Patent Agents Ltd.; Menachem Nathan

(57) ABSTRACT

The present application discloses a liquid crystal display panel and a display terminal, a light transmittance of a primary area color filter block of the liquid crystal display panel is less than a light transmittance of a secondary area color filter block; when a gray level value of an image data is less than a preset value, the primary area pixel electrode is driven to display, and when the gray level value of the image data is greater than the preset value, the primary area pixel electrode and the secondary area pixel electrode are driven to display, so that the overall gray level color gamut is increased without losing the light transmittance, and the color deviation at the large viewing angle is improved.

20 Claims, 10 Drawing Sheets

(52) U.S. Cl.
CPC ......... *G02F 1/136272* (2021.01); *G09G 3/20* (2013.01); *G09G 3/3648* (2013.01); *G09G 3/3685* (2013.01); *G09G 2300/0426* (2013.01); *G09G 2300/0443* (2013.01); *G09G 2300/0452* (2013.01); *G09G 2310/08* (2013.01); *G09G 2320/0209* (2013.01); *G09G 2320/0271* (2013.01); *G09G 2354/00* (2013.01); *G09G 2360/16* (2013.01)

(58) Field of Classification Search
CPC ......... G09G 3/3648; G09G 2300/0426; G09G 2300/0443; G09G 2300/0452; G09G 2320/0209; G09G 2354/00; G09G 2360/16; G02F 1/136222; G02F 1/136286; G02F 1/136272
See application file for complete search history.

(56) References Cited

U.S. PATENT DOCUMENTS

| | | | |
|---|---|---|---|
| 2006/0007088 A1* | 1/2006 | Igeta | G02F 1/133514 345/88 |
| 2007/0058122 A1 | 3/2007 | Ong | |
| 2007/0109482 A1* | 5/2007 | Kim | G02F 1/1393 349/144 |
| 2008/0180617 A1 | 7/2008 | Wu | |
| 2012/0287166 A1 | 11/2012 | Wyatt | |
| 2015/0309360 A1* | 10/2015 | Wang | G02F 1/133514 345/694 |
| 2016/0246124 A1* | 8/2016 | Du | G02F 1/134309 |
| 2016/0291367 A1* | 10/2016 | Cheng | H01L 27/124 |
| 2017/0103715 A1* | 4/2017 | Oyama | G09G 3/36 |
| 2018/0157080 A1* | 6/2018 | Um | G02F 1/136286 |

FOREIGN PATENT DOCUMENTS

| | | |
|---|---|---|
| CN | 107065350 A | 8/2017 |
| CN | 108732806 A | 11/2018 |
| CN | 109116645 A | 1/2019 |
| CN | 109212816 A | 1/2019 |
| CN | 110109296 A | 8/2019 |
| CN | 111077689 A | 4/2020 |
| CN | 111158182 A | 5/2020 |
| CN | 112198726 A | 1/2021 |

* cited by examiner

LIQUID CRYSTAL DISPLAY PANEL AND DISPLAY TERMINAL

FIELD OF INVENTION

The present application relates to a display technology field, in particular to a liquid crystal display panel and a display terminal.

BACKGROUND OF INVENTION

In a conventional VA (Vertical Alignment) mode liquid crystal display (LCD), at different viewing angles, due to the greater difference in birefringence of liquid crystal molecules, the full wavelength transmittance characteristics of visible light at a front viewing angle and a large viewing angle are different, as a result, the optical characteristics of the VA-type LCD when viewing in the large viewing angle cannot maintain the same color as that viewing in the front viewing angle, and thus there are problems such as color shift defect and color distortion at large viewing angle. In this regard, a pixel design of a multi domain display is usually used to improve the color shift of the LCD at a large viewing angle. However, because the contrast ratio of the LCD in the VA mode is relatively lower, the color gamut is low at a low gray level, and the color gamut is maintained substantially unchanged after a certain gray level is reached. A conventional method for improving the color gamut at the low gray level, such as increasing a thickness of a color filter or adopting a color filter of a high color gamut, may affect the transmittance and reduce the transmittance.

SUMMARY OF INVENTION

Technical Problem

Embodiments of the present application provide a liquid crystal display panel and a display terminal to solve a problem that a transmittance of a conventional liquid crystal display panel is reduced when an overall color gamut of gray scale is increased.

Technical Solution

An embodiment of the present application provides a liquid crystal display panel comprising a data driving unit; a first substrate comprising a first base substrate and a pixel electrode layer disposed on the first base substrate, wherein the pixel electrode layer comprises a plurality of subpixel electrodes arranged in an array, each of the plurality of subpixel electrodes comprises a primary area pixel electrode and a secondary area pixel electrode; a second substrate disposed opposite to the first substrate, wherein the second substrate comprises a second base substrate and a color filter layer disposed on one side of the second base substrate facing the first substrate, the color filter layer comprises a plurality of color filter blocks arranged in an array, the color filter block comprises a primary area color filter block corresponding to the primary area pixel electrode and a secondary area color filter block corresponding to the secondary area pixel electrode, and the primary area color filter block has a light transmittance less than a light transmittance of the secondary area color filter block; and a liquid crystal layer disposed between the first substrate and the second substrate; the primary area pixel electrode is in a light transmitting state when a gray level value of an image data is less than a preset value; the primary area pixel electrode and the secondary area pixel electrode are in the light transmitting state when the gray level value of the image data is greater than the preset value.

Alternatively, a thickness of the secondary area color filter block is less than a thickness of the primary area color filter block.

Alternatively, an area of the secondary area color filter block is greater than an area of the secondary area pixel electrode.

Alternatively, an area of the secondary area color filter block is less than an area of the secondary area pixel electrode.

Alternatively, the area of the secondary area pixel electrode of each of the subpixel electrodes is greater than an area of the primary area pixel electrode.

Alternatively, the preset value ranges from 75 to 100.

Alternatively, the first substrate further comprises a plurality of primary data lines and a plurality of secondary data lines disposed on the first base substrate and connected to the data driving unit, wherein each of the subpixel electrodes corresponds to one of the primary data lines and one of the secondary data lines, the primary data line is electrically connected to the primary area pixel electrode, and the secondary data line is electrically connected to the secondary area pixel electrode.

Alternatively, when the gray level value of the image data is less than the preset value, a data signal supplied from the data driving unit is input to the primary data line; when the gray level value of the image data is greater than the preset value, data signals supplied from the data driving unit are input to the primary data line and the secondary data line, respectively.

Alternatively, a thin film transistor area and a scan line are disposed between the primary area pixel electrode and the secondary area pixel electrode.

An embodiment of the present application further provides a display terminal, the display terminal comprises a terminal main body, a liquid crystal display panel as described above, a timing control unit, and a housing, the liquid crystal display panel is disposed on a surface of the housing, the terminal main body and the timing control unit are disposed in the housing, the terminal main body is connected to the timing control unit for providing displayed content, and the timing control unit is connected to the liquid crystal display panel for converting the displayed content into an image data and providing the image data to the liquid crystal display panel.

Advantageous Effects

Advantageous effects of the present application are that: a light transmittance of a primary area color filter block of the liquid crystal display panel is less than a light transmittance of a secondary area color filter block; when a gray level value of an image data is less than a preset value, the primary area pixel electrode is driven to display, and when the gray level value of the image data is greater than the preset value, the primary area pixel electrode and the secondary area pixel electrode are driven to display, and thus, since only the primary area pixel electrode operates when the gray level value at the low gray level stage is less than the preset value, and the secondary area pixel electrode does not operate, the color gamut value at the low gray level stage can be improved, so that the overall gray level color gamut can be improved, further, although the primary area color filter block having a wider color gamut representation indicates that the light transmittance of the primary area color filter block is less than the light transmittance of the secondary area color filter block, since the light transmittance at the low gray level has little effect on the overall brightness of the display panel, the overall gray level color gamut is increased without losing the light transmittance, the color deviation at the large viewing angle is improved, and the picture quality is improved.

Figure 5:
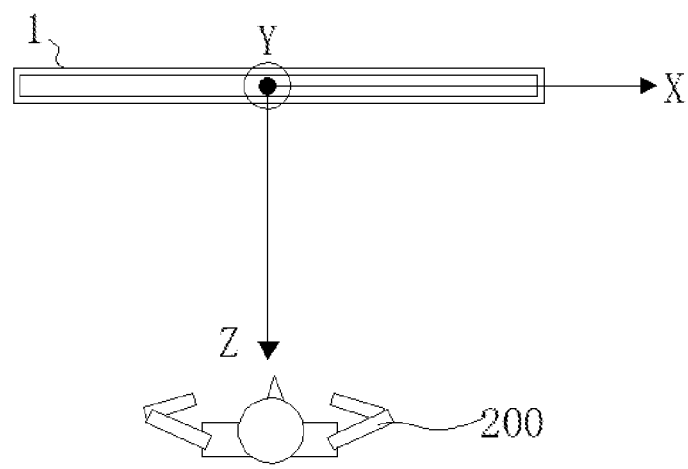
FIG. 5 is a schematic view of the relative position between the viewer and a liquid crystal display when viewing from the front.
Figure 5A:
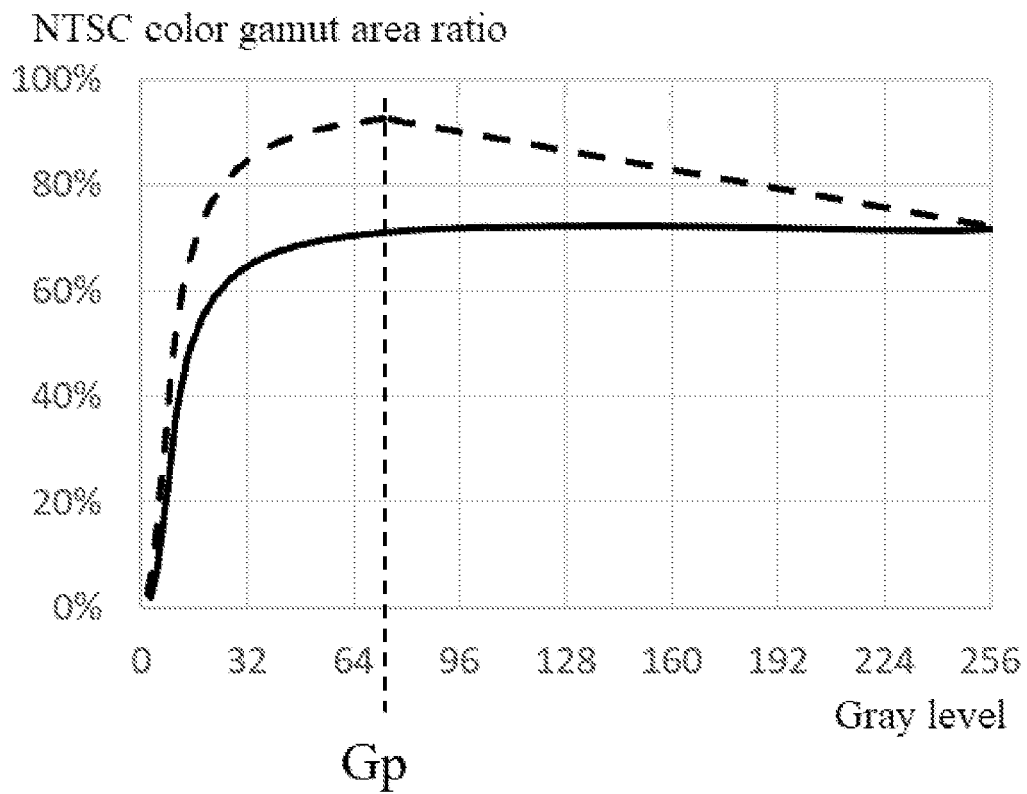
FIG. 5a is a comparative view showing the relationship between the graphs of the gray level-NTSC color gamut area ratio of a liquid crystal display using the liquid crystal display panel provided by the exemplary embodiment of the present invention and a conventional liquid crystal display when viewing form front.
Figure 6:
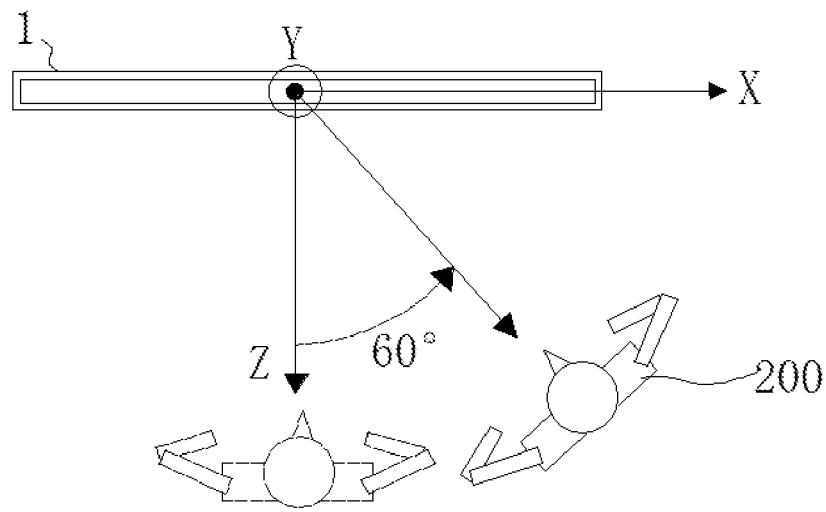
FIG. 6 is a schematic view of a relative position of a viewer and a liquid crystal display at a horizontal right viewing angle of 60°.
Figure 6A:
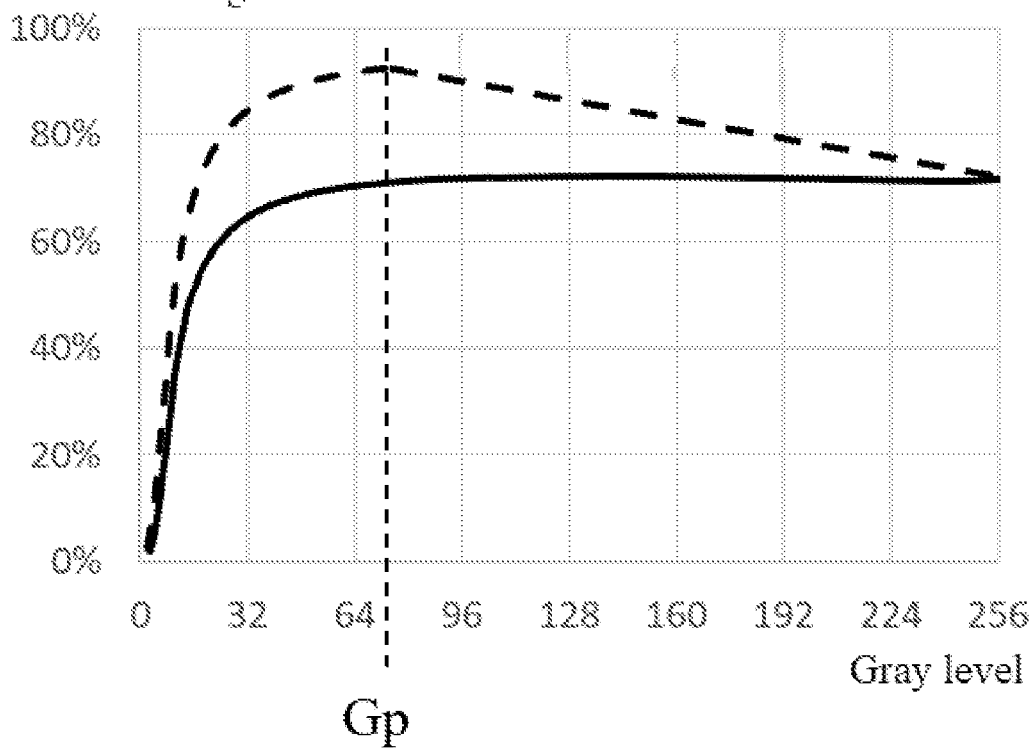
FIG. 6a is a comparative view showing the relationship between the graphs of the gray level-NTSC color gamut area ratio of a liquid crystal display using the liquid crystal display panel provided by the exemplary embodiment of the present invention and a conventional liquid crystal display at a horizontal right viewing angle of 60°.
Figure 7:
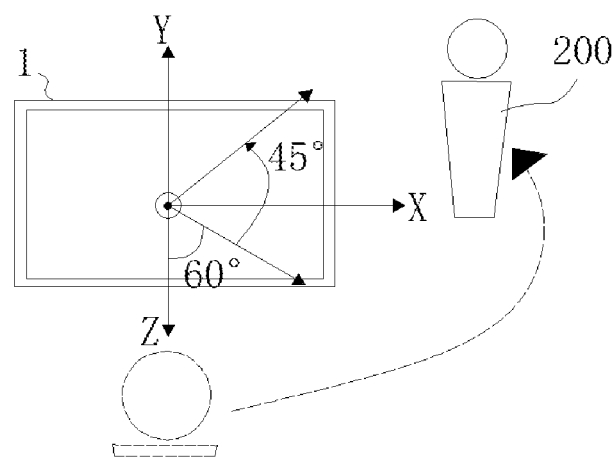
FIG. 7 is diagrams showing relative positions of a viewer and a liquid crystal display when a viewer deviates from a horizontal direction by 45° and a right viewing angle is 60°.
Figure 7A:
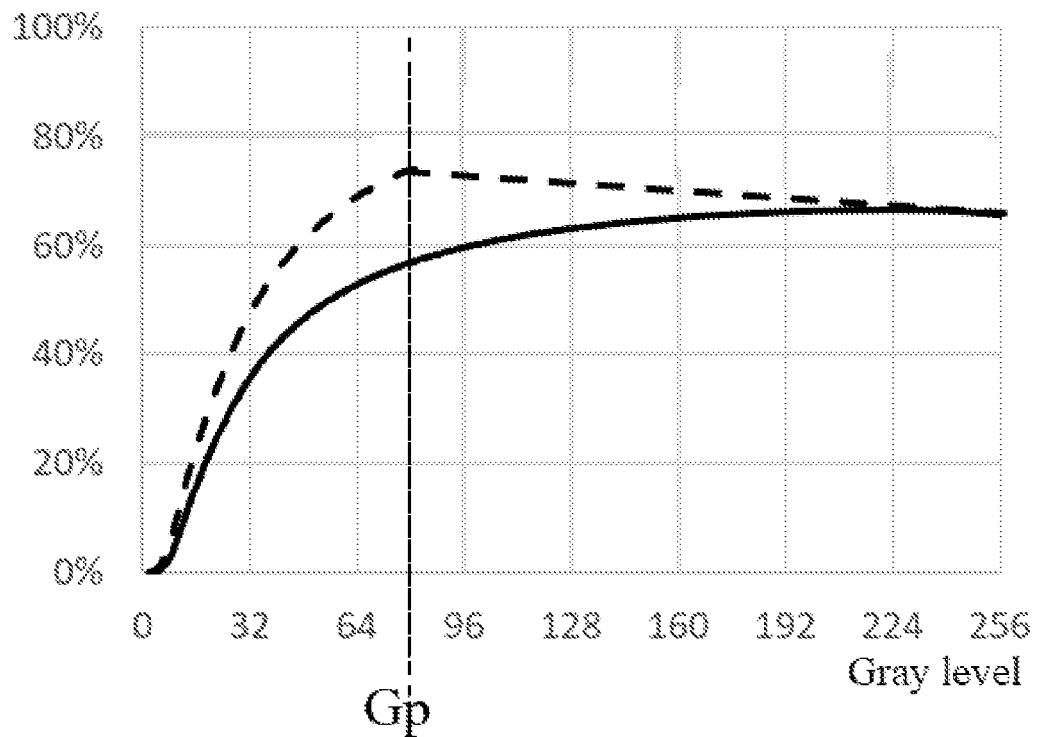
FIG. 7a is a comparative view showing the relationship between the graphs of the gray level-NTSC color gamut area ratio of a liquid crystal display using the liquid crystal display panel provided by the exemplary embodiment of the present invention and a conventional liquid crystal display when a viewer deviates from a horizontal direction by 45° and a right viewing angle is 60°.

Wherein, in FIG. 5a, FIG. 6a, and FIG. 7a, a solid-line curve represents a curve of the gray level-NTSC color gamut area ratio of a conventional liquid crystal display, and a dashed-line curve represents a curve of the gray level-NTSC color gamut area ratio of a liquid crystal display using a liquid crystal display panel provided in an exemplary embodiment of the present invention.

The components in the figure are numbered as follows:

1: liquid crystal display, 100: liquid crystal display panel, 10: first substrate, 110, 110': first base substrate, 111, 111': gate insulating layer, 120, 120': subpixel, 121: subpixel electrode, 121a: primary area pixel electrode, 121b: secondary area pixel electrode, 122: thin film transistor area, 130: data line, 130a: primary data line, 130b: secondary data line, 20, 20': second substrate, 210: second base substrate, 220, 220': color filter layer, 220a: primary area color filter block, 220b, 220b': secondary area color filter block, 30: liquid crystal layer, 40: data driving unit;

2: display terminal; 200: viewer; 300: terminal body; 400: timing control unit; 500: housing.

DETAILED DESCRIPTION OF EMBODIMENTS

Technical solutions in embodiments of the present application will be clearly and completely described below in conjunction with drawings in the embodiments of the present application. Obviously, the described embodiments are only a part of embodiments of the present application, rather than all the embodiments. Based on the embodiments in the present application, all other embodiments obtained by those skilled in the art without creative work fall within the protection scope of the present application.

In the liquid crystal display panel, the light transmittance of the primary area color filter block is less than that of the secondary area color filter block; and the data driving unit is configured to drive the primary area pixel electrode to display when the gray level value of the image data is less than a preset value, and to drive the primary area pixel electrode and the secondary area pixel electrode to display when the gray level value of the image data is greater than the preset value, thereby improving the overall gray level color gamut without losing the transmittance, improving the color deviation at a large viewing angle, and improving the picture quality. As a typical application, the liquid crystal display panel may be applied to a display terminal, for example, a large-sized liquid crystal display panel such as a VA type liquid crystal display, a liquid crystal television, or the like.

Figure 4:
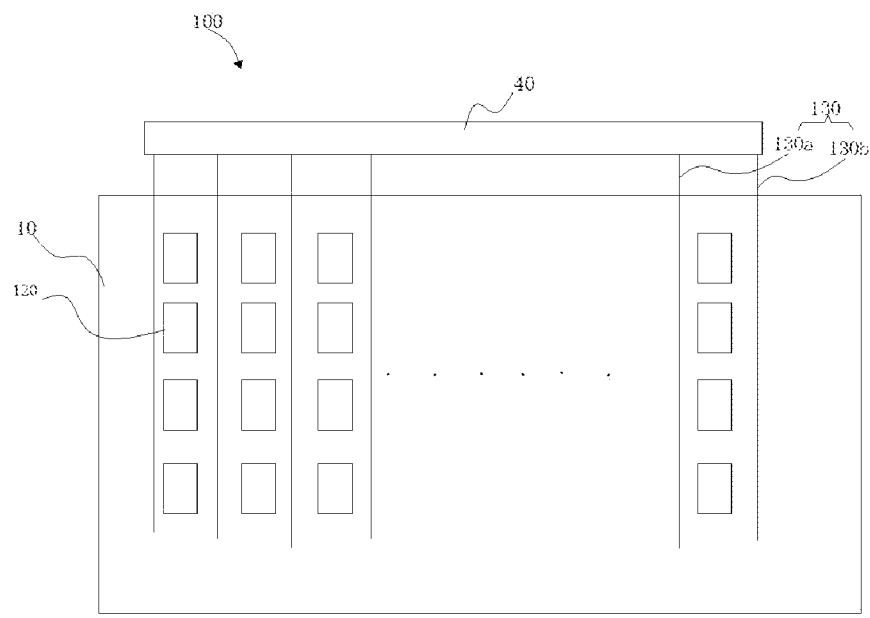
FIG. 4 is a schematic structural diagram of a liquid crystal display panel according to an exemplary embodiment of the present invention.

In an embodiment of the present invention, referring to FIG. 4, a liquid crystal display panel 100 includes a first substrate 10, a second substrate 20, a liquid crystal layer 30, and a data driving unit 40. Referring to FIGS. 2a and 2b, the first substrate 10 and the second substrate 20 are disposed opposite to each other. The liquid crystal layer 30 is disposed between the first substrate 10 and the second substrate 20. The first substrate 10 is an array substrate, and the second substrate 20 is a color filter substrate.

Figure 1A:
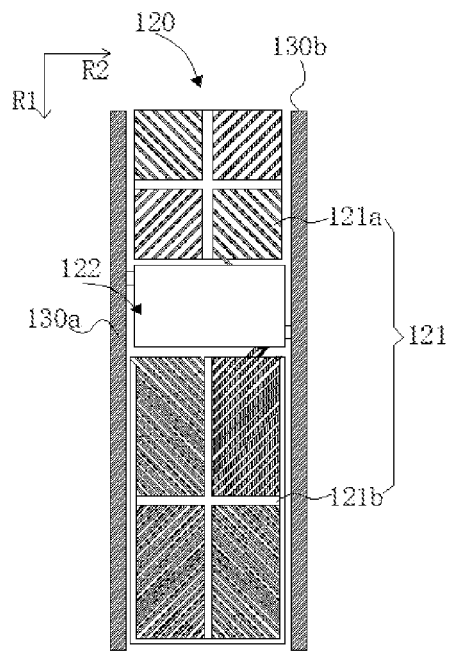
FIG. 1a is a schematic structural diagram of a subpixel of a liquid crystal display panel according to an exemplary embodiment of the present invention.
Figure 1B:
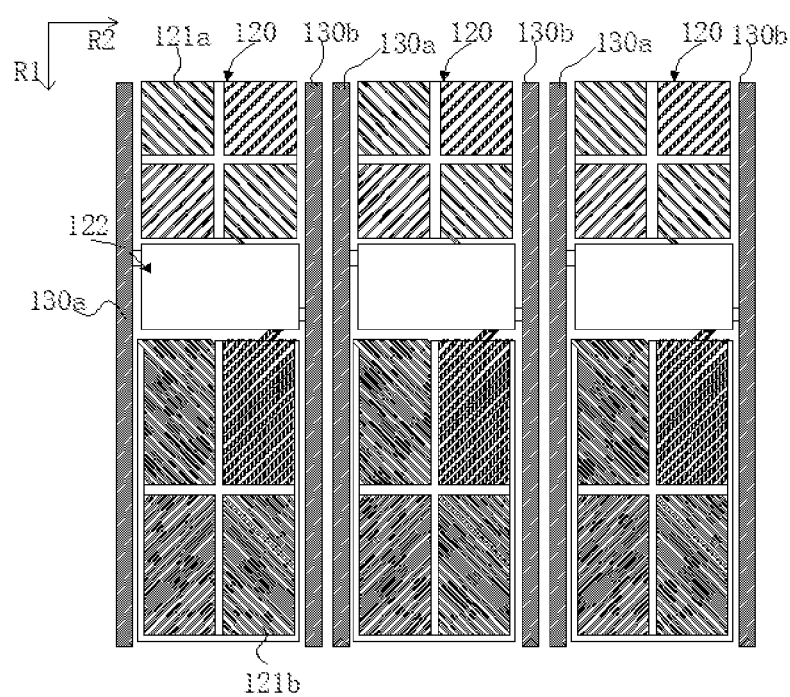
FIG. 1b is a schematic structural diagram of three subpixels arranged adjacent to each other in a row direction R2 in a liquid crystal display panel according to an exemplary embodiment of the present invention.

The first substrate 10 includes a first base substrate 110, a gate insulating layer 111 disposed on the first base substrate 110, and a pixel electrode layer disposed on the gate insulating layer 111. Referring to FIG. 1a, the pixel electrode layer includes a plurality of subpixel electrodes 121 arranged in an array. Referring to FIGS. 2a and 2b together, each of subpixel electrodes 121 includes a primary area pixel electrode 121a and a secondary area pixel electrode 121b, referring to FIG. 1a. A thin film transistor area 122 and a scan line (not shown) are disposed between the primary area pixel electrode 121a and the secondary area pixel electrode 121b. Referring to FIG. 1b, two data lines 130a, 130b are disposed between two adjacent columns of subpixel electrodes. The data lines 130a and 130b are disposed in a column direction R1. The plurality of data lines 130a, 130b are arranged at intervals in a row direction R2. Referring to FIGS. 2a and 2b, data lines 130a and 130b are disposed on the first base substrate 110. The gate insulating layer 111 covers the data lines 130a and 130b.

The structure of the subpixel electrode 121 is an eight-domain pixel electrode structure, the primary area pixel electrode 121a and the secondary area pixel electrode 121b are respectively divided into four domains, the surface of the pixel electrode in each domain has parallel grooves or protrusions, and the area of the secondary area pixel electrode 121b is greater than that of the primary area pixel electrode 121a. Embodiments of the present invention do not limit the number of thin film transistors and capacitors in a pixel structure.

Referring to FIGS. 2a and 2b, the second substrate 20 includes a second base substrate 210 and a color filter layer 220 disposed on one side of the second base substrate 210 facing the first base substrate 110. The color filter layer 220 includes a plurality of color filter blocks arranged in an array. One color filter block corresponds to one subpixel electrode 121. Each of the color filter blocks includes a primary area color filter block 220a corresponding to the primary area pixel electrode 121a and a secondary area color filter block 220b corresponding to the secondary area pixel electrode 121b.

Referring to FIGS. 1a, 1c, 2a, and 2b, in this embodiment, the light transmittance of the primary area color filter block 220a corresponding to each of the subpixel electrodes 121 is less than the light transmittance of the secondary area color filter block 220b; the data driving unit 40 is configured to input a data signal to the primary area pixel electrode 121a when the gray level value of the image data is less than a preset value Gp, and to drive the primary area pixel electrode 121a to display, and the primary area pixel electrode 121a is in a state that light passes through it (or a light transmitting state). When the gray level value of the image data is greater than the preset value Gp, the data driving unit 40 is configured to input data signals to the primary area pixel electrode 121a and the secondary area pixel electrode 121b respectively, to drive the primary area pixel electrode 121a and the secondary area pixel electrode 121b at the same time to display, and both the primary area pixel electrode 121a and the secondary area pixel electrode 121b are both in a light transmitting state.

Figure 1C:
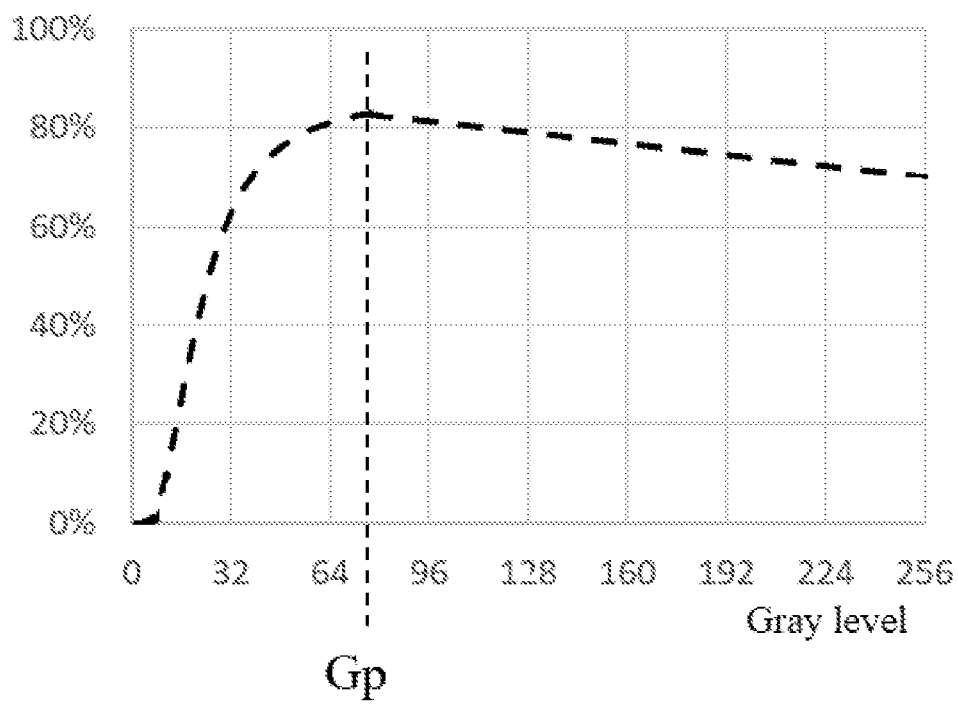
FIG. 1c is a graph of gray level-NTSC color gamut area ratio according to an exemplary embodiment of the present invention.

Specifically, referring to FIG. 1c, the dashed-line curve at the left side of the preset value Gp in the curve of the gray level-NTSC color gamut area ratio of the liquid crystal display indicates that the primary area pixel electrode 121a is driven to display when the image data has a low gray level. Wherein the primary area color filter block 220a has a wider color gamut representation, and the color gamut area ratio can be increased more rapidly than the solid-line curve of the prior art. Although the primary area color filter block 220a having a wider color gamut representation indicates that the light transmittance of the primary area color filter block 220a is less than the light transmittance of the secondary area color filter block 220b, since the light transmittance at the low gray level has little effect on the overall brightness of the display panel, the brightness of the panel at the low gray level is not affected except for obtaining the dashed-line curve, which climbs quickly, on the left side of the preset value Gp shown in FIG. 1c. In addition, the dashed-line curve on the right side of the preset value Gp indicates that the primary area pixel electrode 121a and the secondary area pixel electrode 121b are simultaneously driven to display when the image data has a high gray level. Since the color gamut representation of the secondary area color filter block 220b is not as wide as the primary area color filter block 220a, the dashed-line curve gradually decreases to the color gamut area ratio of a certain value as the gray level value increases. However, the color gamut representation of the secondary area color filter block 220b is not as wide as the primary area color filter block 220a, that is, it indicates that the light transmittance of the secondary area color filter block 220b is larger than the light transmittance of the primary area color filter block 220a. Due to the effect of the secondary area color filter block 220b at a high gray level, the overall light transmittance of the pixels is not greatly attenuated. The dashed-line curve of this embodiment has better color gamut representation at low gray level than that of the solid-line curve of the prior art. The color gamut representation at high gray level is also superior to that of the prior art without loss of transmittance, and the picture quality is improved.

The colors of the color filter blocks of the two adjacent subpixels 120 arranged along the row direction R2 are different. Referring to FIG. 2c, in this embodiment, taking three adjacent subpixels as an example, the colors of the color filter blocks of the three adjacent subpixels 120 are respectively red (R), green (G), and blue (B).

Referring to FIG. 2a, in this embodiment, in each subpixel 120, an area of the primary area color filter block 220a is larger than an area of the primary area pixel electrode 121a, and the primary area color filter block 220a covers all the primary area pixel electrodes 121a. Referring to FIG. 2b, an area of the secondary area color filter block 220b is less than an area of the secondary area pixel electrode 121b, and the secondary area color filter block 220b covers a portion of the secondary area pixel electrode 121b.

Specifically, the primary area color filter block 220a and the secondary area color filter block 220b use the same color filter material, and the color filter material is a color filter material that can exhibit a high color gamut performance, such as products of the types OPTLION GREEN 8880] and [OPTLION GREEN 8890 by Toyo Corporation (TOYO VISUAL SOLUTIONS CO., LTD.). Color filters of other materials may also be used as long as a color gamut area of the final presented color gamut representation is more than 72% of the NTSC color gamut area.

Figure 2:
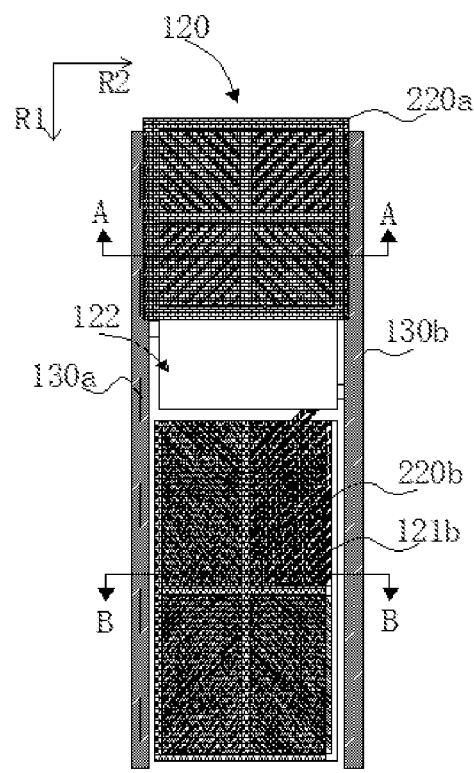
FIG. 2 is a schematic diagram of a matched structure of a subpixel and a color filter layer in a liquid crystal display panel according to an exemplary embodiment of the present invention.
Figure 2A:
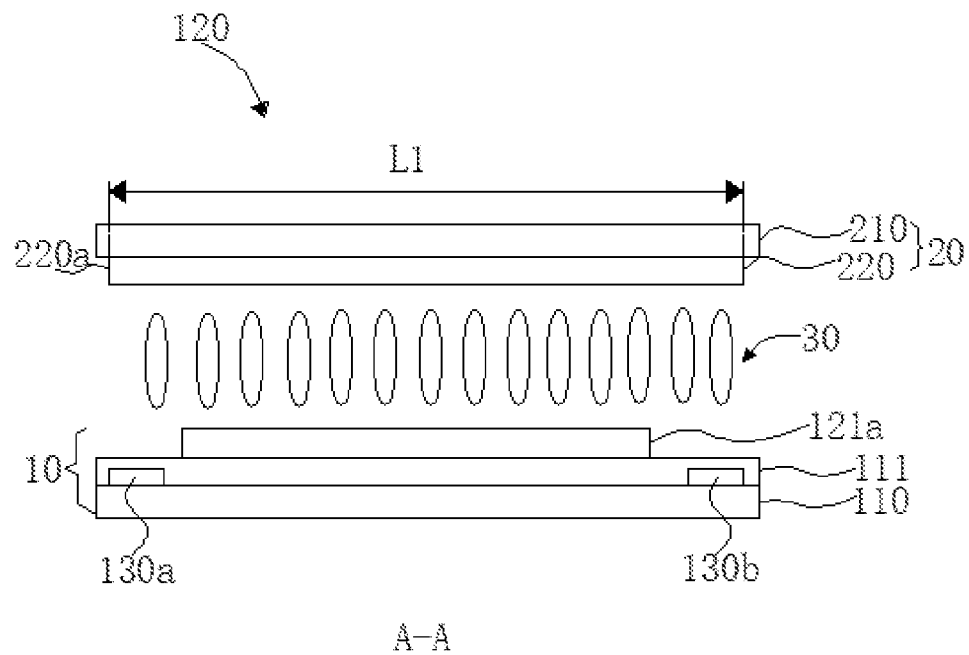
FIG. 2a is a schematic view of a cross-sectional structure along an A-A direction of a subpixel in a liquid crystal display panel according to an exemplary embodiment of the present invention.
Figure 2B:
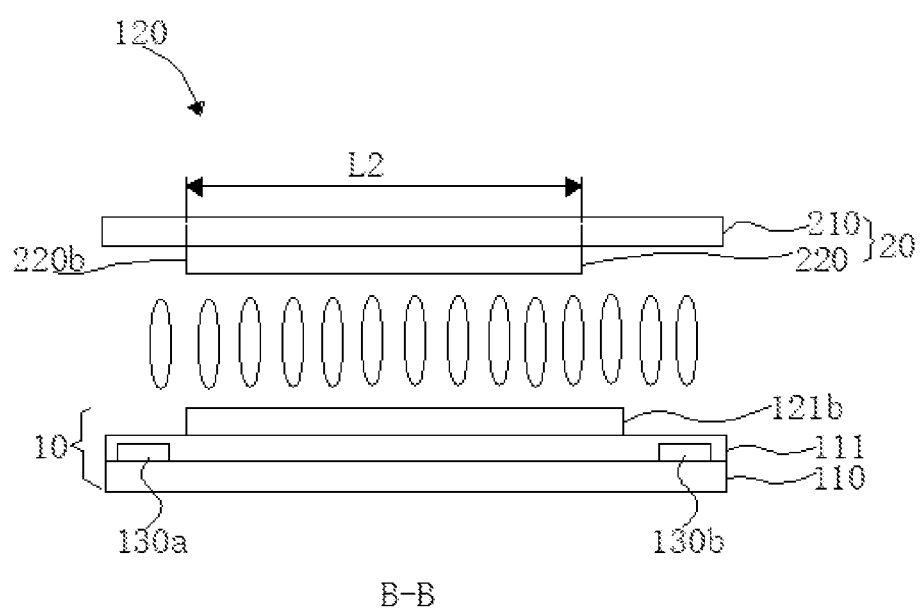
FIG. 2b is a schematic view of a cross-sectional structure along an B-B direction of a subpixel in a liquid crystal display panel according to an exemplary embodiment of the present invention.
Figure 2C:
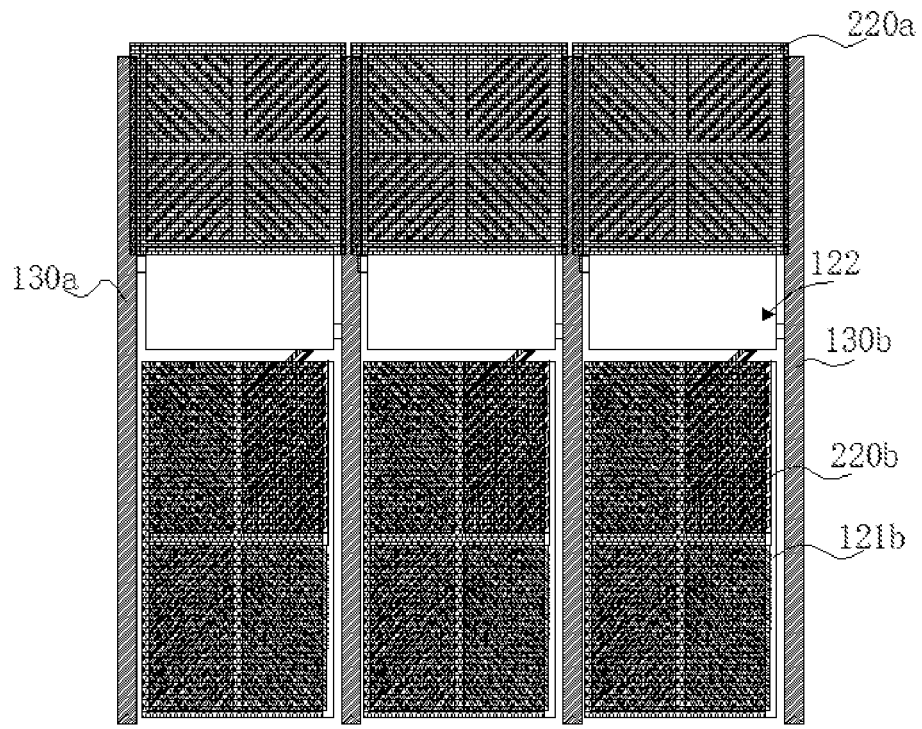
FIG. 2c is a schematic structural view of a matched structure of three subpixels arranged adjacent to each other in a row direction R2 and a corresponding color filter layer in the liquid crystal display panel according to an exemplary embodiment of the present invention.

In order to make the light transmittance of the secondary area color filter block 220b larger than that of the primary area color filter block 220a, two schemes may be adopted, one of which is shown in FIGS. 2, 2a and 2b. A width of the primary area color filter block 220a in the row direction R2 is L1, a width of the secondary area color filter block 220b in the row direction R2 is L2, and L1>L2. The thickness of the primary area color filter block 220a is the same as the thickness of the secondary area color filter block 220b. That is, the design, in which the color filter blocks have the same thickness but area ratios of the color filter blocks to the pixel electrodes are different, is adopted, so that the light transmittance of the secondary area color filter block 220b is larger than the light transmittance of the primary area color filter block 220a.

In this embodiment, since the area of the secondary area color filter block 220b is less than the area of the secondary area pixel electrode 121b, that is, the secondary area color filter block 220b does not completely cover the secondary area pixel electrode 121b, specifically, for example, a part of the secondary area color filter block 220b is hollowed out to expose a part of the secondary area pixel electrode 121b, so that the color gamut representation from the secondary area pixel electrode 121b and the secondary area color filter block 220b is lower than the color gamut representation from the primary area pixel electrode 121a and the primary area color filter block 220a. However, the light transmittance of the secondary area color filter block 220b can be improved to avoid the problem of low light transmittance due to improved color gamut representation in the prior art.

In the present embodiment, referring to FIG. 4, the first substrate 10 further includes a plurality of data lines 130 disposed on the first base substrate 110 and connected to the data driving unit 40, the data lines 130 include a plurality of primary data lines 130a and a plurality of secondary data lines 130b connected to the data driving unit 40 respectively, wherein each of the subpixels 120 corresponds to one primary data line 130a and one secondary data line 130b, the primary data lines 130a is located on one side of the subpixel 120, and the secondary data line 130b is located on another side of the subpixel 120. Referring to FIG. 1a, wherein the primary data line 130a provides a data voltage to the primary area pixel electrode 121a, and the secondary data line 130b provides a data voltage to the secondary area pixel electrode 121b.

The thin film transistor area 122 includes a primary area thin film transistor (not shown) and a secondary area thin film transistor (not shown), the primary area pixel electrode 121a is connected to the primary data line 130a through the primary area thin film transistor, and the secondary area pixel electrode 121b is connected to the secondary data line 130b through the secondary area thin film transistor. The data driving unit 40 is configured to supply the data voltage to the primary data line 130a when the gray level value of the image data is less than the preset value, and to supply the data voltages to the primary data line 130a and the secondary data line 130b when the gray level value of the image data is larger than the preset value.

Referring to FIGS. 5a, 6a, and 7a, in the present embodiment, the preset value Gp ranges from 75 to 100, the secondary area pixel electrode 121b is driven when the gray level is larger than the preset value Gp, and since the color gamut representation from the secondary area pixel electrode 121b and the secondary area color filter block 220b is less than the color gamut representation from the primary area pixel electrode 121a and the primary area color filter block 220a, only the primary area pixel electrode 121a is operated in the low gray level region lower than the preset value Gp, thereby improving the color gamut representation of the low gray level region. When the gray level reaches the preset value Gp, the performance of the color gamut is the best, and the ratio of the color gamut area to the NTSC color gamut area reaches the maximum. When the gray level exceeds the preset value Gp, the secondary area pixel electrode 121b starts to operate, and the color gamut representation starts to decrease. Then, as the gray level continuously increases to the 255, the ratio of the color gamut area to the NTSC color gamut area gradually decreases and stably remains at 72% of the NTSC (National Television System Committee) color gamut. Therefore, in the present embodiment, since the color gamut representation at low gray level is improved, the average color gamut representation of the overall gray level is improved, and finally the color gamut area is maintained at 72% of the NTSC color gamut area. Furthermore, there is no loss of transmittance, and the screen display quality at different viewing angles is improved.

Specifically, referring to FIGS. 5a, 6a, and 7a, whether a viewer 200 views the liquid crystal display 1 using the liquid crystal display panel 100 provided in the present embodiment from front (FIG. 5), or the viewer 200 views the liquid crystal display 1 using the liquid crystal display panel 100 provided in the present embodiment at the right viewing angle of 60° (FIG. 6), or the viewer 200 views the liquid crystal display 1 using the liquid crystal display panel 100 provided in the present embodiment at the right viewing angle of 60° and a 45° deviation from the horizontal direction (FIG. 7), in the obtained relationship graph of the gray level—the ratio of the color gamut area to NTSC color gamut area, the average value of the color gamut representation of the liquid crystal display 1 using the liquid crystal display panel 100 provided in the present embodiment (dashed-line in FIGS. 5a, 6a, and 7a) is significantly higher than that of the color gamut representation of the conventional display (solid-line in FIGS. 5a, 6a, and 7a). The ratios of the color gamut area to the NTSC color gamut area corresponding to the highest points of the curves in FIGS. 5a, 6a and 7a are the ratio of the color gamut area to the NTSC color gamut area corresponding to the preset value Gp.

Here, referring to FIGS. 2 and 2a, the primary area color filter block 220a covers the data lines 130 (i.e., the primary data line 130a and the secondary data line 130b) located on both sides of the primary area pixel electrode 121a. Referring to FIG. 2b, the area of the secondary area color filter block 220b is less than the area of the secondary area pixel electrode 121b. The primary area color filter block 220a covers all the primary area pixel electrodes 121a and covers the data lines 130a, 130b corresponding to the primary area pixel electrodes 121a. The secondary area color filter block 220b exposes a portion of the secondary area pixel electrode 121b and exposes corresponding data lines 130a, 130b.

As another improvement, referring to FIGS. 3, 3a, 3b, and 3c, the primary area color filter block 220a and the secondary area color filter block 220b' use the same color filter material, and the area ratios of the color filter blocks to the pixel electrodes are same, but a thickness S2 of the secondary area color filter block 220b' is less than a thickness S1 of the primary area color filter block 220a. Specifically, in this embodiment, the area of the secondary area color filter block 220b' of each of the subpixels 120' is larger than the area of the secondary area pixel electrode 121b. That is, the arrangement ratio of the secondary area color filter block 220b' and the secondary area pixel electrode 121b is the same as that of the primary area color filter block 220a and the primary area pixel electrode 121a. Because the thicknesses of the color filter blocks are different, the color gamut representation from the secondary area pixel electrode 121b and the secondary area color filter block 220b' is lower than that from the primary area pixel electrode 121a and the primary area color filter block 220a.

Figure 3:
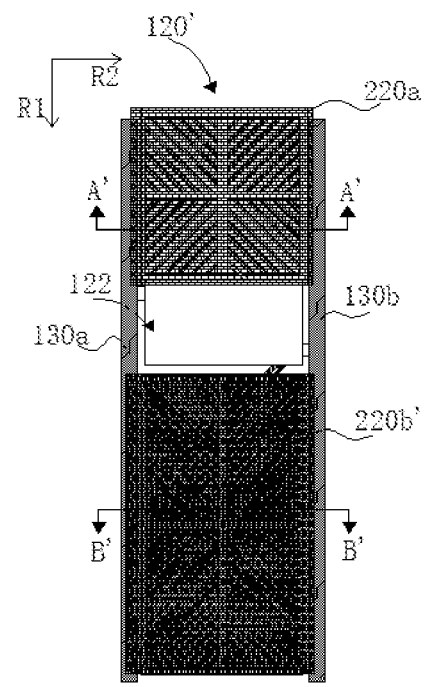
FIG. 3 is a schematic view of a matched structure of a subpixel and a color filter layer in a liquid crystal display panel according to another exemplary embodiment of the present invention.
Figure 3A:
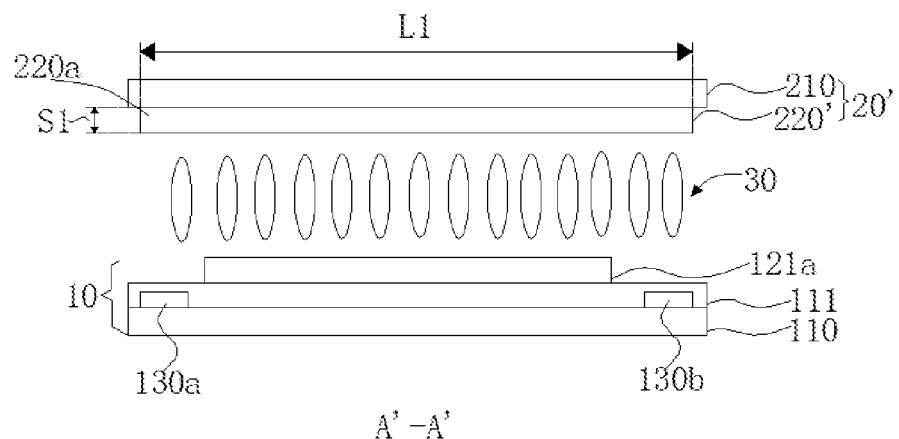
FIG. 3a is a schematic view of a cross-sectional structure along an A'-A' direction of a subpixel in a liquid crystal display panel according to another exemplary embodiment of the present invention.

Referring to FIG. 3, in the same subpixel 120', the width of the secondary area color filter block 220b' in the row direction R2 is the same as the width of the primary area color filter block 220a in the row direction R2. Referring to FIG. 3a, the width of the primary area color filter block 220a in the row direction R2 is L1, and referring to FIG. 3b, the width of the secondary area color filter block 220b' in the row direction R2 is L2', wherein L1=L2'.

Figure 3B:
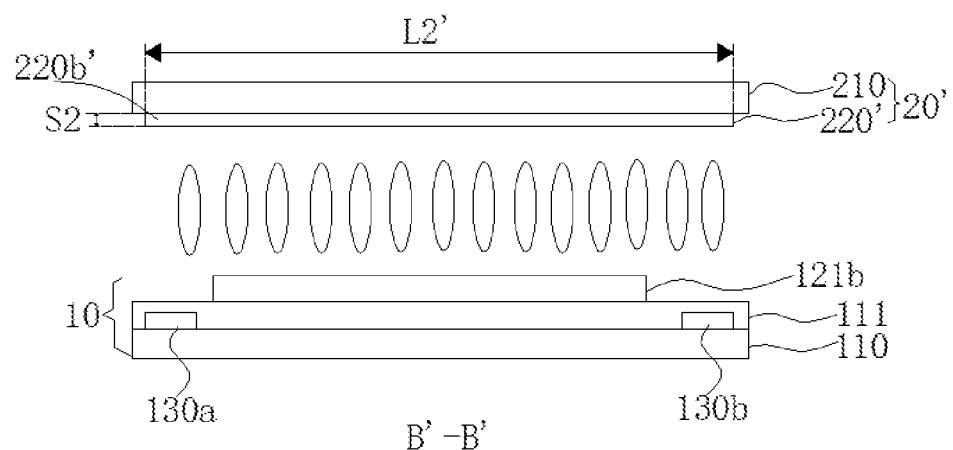
FIG. 3b is a schematic view of a cross-sectional structure along an B'-B' direction of a subpixel in a liquid crystal display panel according to another exemplary embodiment of the present invention.

Preferably, in this embodiment, referring to FIG. 3a, the primary area color filter block 220a covers the data lines 130a, 130b. Referring to FIG. 3b, the area of the secondary area color filter block 220b' is larger than the area of the secondary area pixel electrode 121b. The secondary area color filter block 220b' covers the data lines 130a, 130b.

Figure 3C:
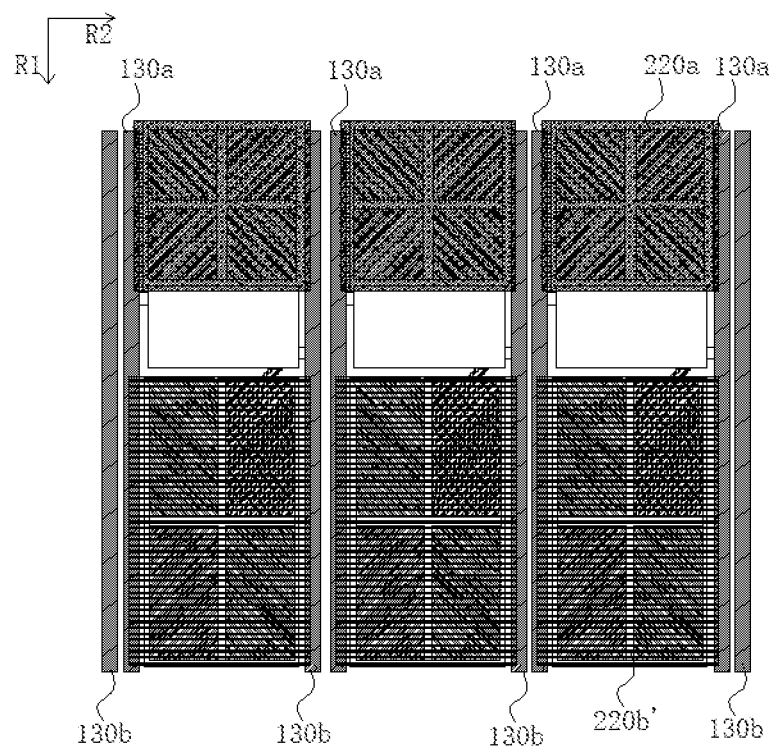
FIG. 3c is a schematic view of a matched structure of three subpixels arranged adjacent to each other in a row direction R2' and a corresponding color filter layer in the liquid crystal display panel according to another exemplary embodiment of the present invention.

In this embodiment, referring to FIG. 3C, three adjacent subpixels are taken as an example, and the colors of the three subpixels are red (R), green (G), and blue (B) sequentially.

In this embodiment, since the thickness S2 of the secondary area color filter block 220b' is less than the thickness S1 of the primary area color filter block 220a, the light transmittance of each of the primary area color filter blocks 220a of the color filter layer 220' is less than the light transmittance of the secondary area color filter block 220b'. The data driving unit 40 is configured to drive the primary area pixel electrode 121a to display when the gray level value of the image data is less than the preset value Gp, and to drive the primary area pixel electrode 121a and the secondary area pixel electrode 121b to display when the gray level value of the image data is larger than the preset value Gp.

Specifically, referring to FIG. 1c, the dashed-line curve at the left side of the preset value Gp in the curve of the gray level-NTSC color gamut area ratio of the liquid crystal display indicates that the primary area pixel electrode 121a is driven to display when the image data has a low gray level. Wherein the primary area color filter block 220a has a wider color gamut representation, and the color gamut area ratio can be increased more rapidly than the solid-line curve of the prior art. Although the primary area color filter block 220a having a wider color gamut representation indicates that the light transmittance of the primary area color filter block 220a is less than the light transmittance of the secondary area color filter block 220b, since the light transmittance at the low gray level has little effect on the overall brightness of the display panel, the brightness of the panel at the low gray level is not affected except for obtaining the dashed-line curve, which climbs quickly, on the left side of the preset value Gp shown in FIG. 1c. In addition, the dashed-line curve on the right side of the preset value Gp indicates that the primary area pixel electrode 121a and the secondary area pixel electrode 121b are simultaneously driven to display when the image data has a high gray level. Since the color gamut representation of the secondary area color filter block 220b is not as wide as the primary area color filter block 220a, the dashed-line curve gradually decreases to the color gamut area ratio of a certain value as the gray level value increases. However, the color gamut representation of the secondary area color filter block 220b is not as wide as the primary area color filter block 220a, that is, it indicates that the light transmittance of the secondary area color filter block 220b is larger than the light transmittance of the primary area color filter block 220a. Due to the effect of the secondary area color filter block 220b at a high gray level, the overall light transmittance of the pixels is not greatly attenuated. The dashed-line curve of this embodiment has better color gamut representation at low gray level than that of the solid-line curve of the prior art. The color gamut representation at high gray level is also superior to that of the prior art without loss of transmittance, and the picture quality is improved.

Figure 8:
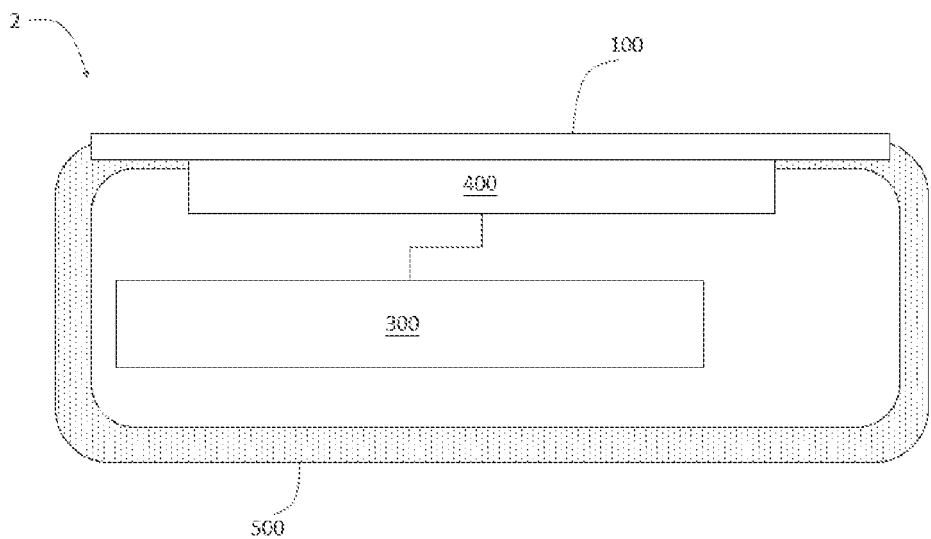
FIG. 8 is a schematic structural diagram of a display terminal according to an embodiment of the present invention.

Referring to FIG. 8, in order to achieve the above object, the present invention further provides a display terminal 2 including a terminal main body 300, a liquid crystal display panel 100 as described above, a timing control unit 400, and a housing 500, the liquid crystal display panel 100 is disposed on a surface of the housing 500, the terminal main body 300 and the timing control unit 400 are disposed in the housing 500, the terminal main body 300 is connected to the timing control unit 400 for providing displayed content, and the timing control unit 400 is connected to the liquid crystal display panel 100 for converting the displayed content into the image data and providing the image data to the liquid crystal display panel 100.

Referring to FIG. 4, in order to achieve the above object, the present invention further provides a data driving unit 120 provided on a liquid crystal display panel 100 and for driving a plurality of subpixels 120 of the liquid crystal display panel 100, the liquid crystal display panel 100 includes a plurality of primary data lines 130a and a plurality of secondary data lines 130b connected to the data driving unit 40, the data driving unit 40 is used to provide a data signal(s) (e.g., a data voltage) to the primary data lines 130a when a gray level value of image data is less than a preset value, and provide a data signal(s) (e.g., a data voltage) to the primary data lines 130a and the secondary data lines 130b when the gray level value of the image data is greater than the preset value, wherein each of the subpixels 120 includes a subpixel electrode 121, each of the subpixel electrodes 121 includes a primary area pixel electrode 121a and a secondary area pixel electrode 121b. The liquid crystal display panel 100 further includes a plurality of color filter blocks arranged in an array, the color filter block includes the primary area color filter block 220a corresponding to the primary area pixel electrode 121a and the secondary area color filter block 220b corresponding to the secondary area pixel electrode 121b, the light transmittance of the primary area color filter block 220a is less than the light transmittance of the secondary area color filter block 220b.

In conclusion, although the present application has been disclosed in the above preferred embodiments, the above preferred embodiments are not intended to limit the present application. A person of ordinary skill in the art may make various changes and finishes without departing from the spirit and scope of the present application. Therefore, the protection scope of the present application is subject to the scope defined by the claims.

What is claimed is:
1. A liquid crystal display panel comprising:
a data driving unit;
a first substrate comprising a first base substrate and a pixel electrode layer disposed on the first base substrate, wherein the pixel electrode layer comprises a plurality of subpixel electrodes arranged in an array, each of the plurality of subpixel electrodes comprises a primary area pixel electrode and a secondary area pixel electrode;
a second substrate disposed opposite to the first substrate, wherein the second substrate comprises a second base substrate and a color filter layer disposed on one side of the second base substrate facing the first substrate, the color filter layer comprises a plurality of color filter blocks arranged in an array, the color filter block comprises a primary area color filter block corresponding to the primary area pixel electrode and a secondary area color filter block corresponding to the secondary area pixel electrode, and the primary area color filter block has a light transmittance less than a light transmittance of the secondary area color filter block; and
a liquid crystal layer disposed between the first substrate and the second substrate,
wherein the primary area pixel electrode is in a light transmitting state and the secondary area pixel electrode is not in the light transmitting state when a gray level value of an image data is less than a preset value; the primary area pixel electrode and the secondary area pixel electrode are in the light transmitting state when the gray level value of the image data is greater than the preset value;
wherein only the primary area pixel electrode is operated in a low gray level region lower than the preset value to improve a color gamut representation of the low gray level region; when the gray level exceeds the preset value, the secondary area pixel electrode starts to operate, and a color gamut representation starts to decrease, and as the gray level continuously increases to the 255, a ratio of a color gamut area to an NTSC color gamut area gradually decreases and stably remains at approximately 72% of the NTSC color gamut;
wherein a thickness of the secondary area color filter block is less than a thickness of the primary area color filter block, and wherein an area ratio of the secondary area color filter block to the secondary area pixel electrode is the same as that of the primary area color filter block to the primary area pixel electrode.

2. The liquid crystal display panel according to claim 1, wherein an area of the secondary area color filter block is greater than an area of the secondary area pixel electrode.

3. The liquid crystal display panel according to claim 1, wherein an area of the secondary area color filter block is less than an area of the secondary area pixel electrode.

4. The liquid crystal display panel according to claim 3, wherein the area of the secondary area pixel electrode of each of the subpixel electrodes is greater than an area of the primary area pixel electrode.

5. The liquid crystal display panel according to claim 1, wherein the preset value is in a range from 75 to 100.

6. The liquid crystal display panel according to claim 5, wherein the first substrate further comprises a plurality of primary data lines and a plurality of secondary data lines disposed on the first base substrate and connected to the data driving unit, wherein each of the subpixel electrodes corresponds to one of the primary data lines and one of the secondary data lines, the primary data line is electrically connected to the primary area pixel electrode, and the secondary data line is electrically connected to the secondary area pixel electrode.

7. The liquid crystal display panel according to claim 6, wherein the primary area color filter block covers the corresponding primary data line and the corresponding secondary data line, and the secondary area color filter block covers the corresponding primary data line and the corresponding secondary data line.

8. The liquid crystal display panel according to claim 5, wherein when the gray level value of the image data is less than the preset value, a data signal supplied from the data driving unit is input to the primary data line; when the gray level value of the image data is greater than the preset value, data signals supplied from the data driving unit are input to the primary data line and the secondary data line, respectively.

9. The liquid crystal display panel according to claim 5, wherein a thin film transistor area and a scan line are disposed between the primary area pixel electrode and the secondary area pixel electrode.

10. The liquid crystal display panel according to claim 9, wherein color filter blocks of two adjacent subpixels arranged in a row direction have different color.

11. The liquid crystal display panel according to claim 1, wherein each of the plurality of subpixel electrodes has an eight-domain pixel electrode structure, the primary area pixel electrode of the subpixel electrode and the secondary area pixel electrode of the subpixel electrode are respectively divided into four domains each having a rectangle shape, a surface of the pixel electrode in each domain has parallel grooves or protrusions, and an area of the secondary area pixel electrode is greater than that of the primary area pixel electrode.

12. A display terminal comprising a terminal main body, a liquid crystal display panel and a timing control unit, wherein the terminal main body is connected to the timing control unit for providing displayed content, and the timing control unit is connected to the liquid crystal display panel for converting the displayed content into the image data and supplying the image data to the liquid crystal display panel;
the liquid crystal display panel comprises:
a data driving unit;
a first substrate comprising a first base substrate and a pixel electrode layer disposed on the first base substrate, wherein the pixel electrode layer comprises a plurality of subpixel electrodes arranged in an array, each of the plurality of subpixel electrodes comprises a primary area pixel electrode and a secondary area pixel electrode;
a second substrate disposed opposite to the first substrate, wherein the second substrate comprises a second base substrate and a color filter layer disposed on one side of the second base substrate facing the first substrate, the color filter layer comprises a plurality of color filter blocks arranged in an array, the color filter block comprises a primary area color filter block corresponding to the primary area pixel electrode and a secondary area color filter block corresponding to the secondary area pixel electrode, and the primary area color filter block has a light transmittance less than a light transmittance of the secondary area color filter block; and
a liquid crystal layer disposed between the first substrate and the second substrate,
wherein the primary area pixel electrode is in a light transmitting state and the secondary area pixel electrode is not in the light transmitting state when a gray level value of the image data is less than a preset value; the primary area pixel electrode and the secondary area pixel electrode are in the light transmitting state when the gray level value of the image data is greater than the preset value;

wherein only the primary area pixel electrode is operated in a low gray level region lower than the preset value to improve a color gamut representation of the low gray level region; when the gray level exceeds the preset value, the secondary area pixel electrode starts to operate, and a color gamut representation starts to decrease, and as the gray level continuously increases to the 255, a ratio of a color gamut area to an NTSC color gamut area gradually decreases and stably remains at approximately 72% of the NTSC color gamut;

wherein a thickness of the secondary area color filter block is less than a thickness of the primary area color filter block, and wherein an area ratio of the secondary area color filter block to the secondary area pixel electrode is the same as that of the primary area color filter block to the primary area pixel electrode.

13. The display terminal according to claim 12, wherein an area of the secondary area color filter block is greater than an area of the secondary area pixel electrode.

14. The display terminal according to claim 12, wherein an area of the secondary area color filter block is less than an area of the secondary area pixel electrode.

15. The display terminal according to claim 14, wherein the area of the secondary area pixel electrode of each of the subpixel electrodes is greater than an area of the primary area pixel electrode.

16. The display terminal according to claim 12, wherein the preset value is in a range ranges from 75 to 100.

17. The display terminal according to claim 16, wherein the first substrate further comprises a plurality of primary data lines and a plurality of secondary data lines disposed on the first base substrate and connected to the data driving unit, wherein each of the subpixel electrodes corresponds to one of the primary data lines and one of the secondary data lines, the primary data line is electrically connected to the primary area pixel electrode, and the secondary data line is electrically connected to the secondary area pixel electrode.

18. The display terminal according to claim 16, wherein when the gray level value of the image data is less than the preset value, a data signal supplied from the data driving unit is input to the primary data line; when the gray level value of the image data is greater than the preset value, data signals supplied from the data driving unit are input to the primary data line and the secondary data line, respectively.

19. The display terminal according to claim 16, wherein a thin film transistor area and a scan line are disposed between the primary area pixel electrode and the secondary area pixel electrode.

20. The display terminal according to claim 19, wherein color filter blocks of two adjacent subpixels arranged in a row direction have different color.

* * * * *